(12) United States Patent
Yuasa et al.

(10) Patent No.: US 8,167,121 B2
(45) Date of Patent: May 1, 2012

(54) BELT RETENTION GUIDE

(75) Inventors: Kazuyuki Yuasa, Nara (JP); Hironori Kanazawa, Nara (JP); Syogo Kimoto, Nara (JP)

(73) Assignee: Nitta Corporation, Osaka (JP)

( * ) Notice: Subject to any disclaimer, the term of this patent is extended or adjusted under 35 U.S.C. 154(b) by 353 days.

(21) Appl. No.: 12/524,362

(22) PCT Filed: Mar. 19, 2008

(86) PCT No.: PCT/JP2008/055816
§ 371 (c)(1),
(2), (4) Date: Jul. 24, 2009

(87) PCT Pub. No.: WO2008/123335
PCT Pub. Date: Oct. 16, 2008

(65) Prior Publication Data
US 2009/0314614 A1    Dec. 24, 2009

(30) Foreign Application Priority Data

Mar. 22, 2007 (JP) ................. 2007-074049

(51) Int. Cl.
*B65G 21/22* (2006.01)
*B65G 15/64* (2006.01)
(52) U.S. Cl. ........................................ 198/831; 198/837
(58) Field of Classification Search .................. 198/831, 198/837, 840, 841, 842
See application file for complete search history.

(56) References Cited

U.S. PATENT DOCUMENTS

| | | | | |
|---|---|---|---|---|
| 4,024,949 A * | 5/1977 | Kleysteuber et al. | ......... | 198/831 |
| 5,394,977 A * | 3/1995 | Cline | ............................ | 198/831 |
| 5,598,784 A | 2/1997 | Kubsik et al. | | |
| 5,944,171 A * | 8/1999 | Vertogen et al. | ............... | 198/837 |
| 6,564,931 B1 * | 5/2003 | Edelmann | ...................... | 198/831 |
| 6,834,760 B2 * | 12/2004 | Yamazaki | ..................... | 198/831 |
| 6,843,366 B2 | 1/2005 | Shiotani | | |
| 6,843,444 B2 * | 1/2005 | Wood | .......................... | 242/534.1 |
| 6,962,252 B2 * | 11/2005 | Fujiwara et al. | ............... | 198/837 |
| 6,974,022 B2 * | 12/2005 | Saeki | ............................ | 198/831 |
| 7,051,869 B2 * | 5/2006 | Saeki | ............................ | 198/831 |
| 7,232,030 B2 * | 6/2007 | Duncan et al. | ................ | 198/831 |
| 7,249,673 B2 * | 7/2007 | Axmann | ........................ | 198/831 |
| 7,431,149 B2 * | 10/2008 | Hishinuma | ................... | 198/831 |

FOREIGN PATENT DOCUMENTS

| | | |
|---|---|---|
| EP | 0177677 | 4/1986 |
| JP | 61-069603 | 4/1986 |
| JP | 5-024622 | 2/1993 |
| JP | 8-337165 | 12/1996 |
| JP | 2000-247423 | 9/2000 |
| JP | 2004-203504 | 7/2004 |

* cited by examiner

*Primary Examiner* — Douglas Hess
(74) *Attorney, Agent, or Firm* — Ditthavong Mori & Steiner, P.C.

(57) ABSTRACT

The invention relates to a belt retention guide for retaining the position of a belt having beads along its peripheral edge. The belt retention guide comprises a first roller, a movable portion, and a fixing portion. The first roller engages with the beads and retains the position of the beads. The movable portion supports the first roller and the fixing portion engages with the movable portion. The beads are pinched between the first roller and the fixing portion, thereby retaining the position of the belt. The movable portion is configured to be movable between a fixed position where the first roller engages with the beads to pinch them, and a released position where the first roller is separated from the beads to release them. The movable portion is secured in the fixed position by insertion of a stop member through or between the movable portion and the fixing portion.

10 Claims, 11 Drawing Sheets

BELT RETENTION GUIDE

TECHNICAL FIELD

The present invention relates to a belt retention guide that prevents positional deviation of an endless belt, a problem is known to occur in belt conveyor systems.

BACKGROUND ART

In general, a belt conveyer system is provided with a device that prevents deviation of the belt in the axial direction of end rollers to which the belt is entrained. In particular, as for a curved conveyor, two end rollers are separated at a predetermined angle and a belt is entrained about these end rollers. Therefore, the belt is stretched into a fan shape and a centripetal force toward the center of the fan shape acts on the belt during operation. Consequently, the curved belt requires positional retention of its outer periphery in order to prevent positional deviation.

As for a belt retention guide for preventing deviation of a belt, there is known a device that pinches beads attached along the peripheral edge of the curved belt, with a pair of rollers fixed on the body of the conveyor. The curved belt is driven in the circumferential direction without allowing displacement in the radial direction by a plurality of such belt retention guides along the peripheral edge of the curved belt.

DISCLOSURE OF INVENTION

Technical Problem

However, in order to install the beads into the belt retention guides, the rollers provided on typical belt retention guides must be detached from and reattached to the belt retention guide with a tool. Since there are usually many such belt retention guides, the installation is quite laborious.

An object of the present invention is to provide a belt retention guide, in which beads may be easily installed or removed, without any implements.

Technical Solution

The inventive belt retention guide is used to retain the position of a belt having beads along its peripheral edge. The belt retention guide comprises a first roller, a movable portion, and a fixing portion. The first roller engages the beads and retains their position. The movable portion supports the first roller and the fixing portion engages with the movable portion. The beads are pinched between the first roller and the fixing portion; thereby retaining the position of the belt. The movable portion is configured to be movable between a fixed position where the first roller engages and pinches the beads, and a released position where the first roller is detached from the beads to release them. The movable portion is secured to the fixed position by inserting a stop member between or through the movable portion and the fixing portion.

The fixing portion may comprise a second roller, so that the beads are pinched between the first and second rollers. Furthermore, the movable portion may be rotatably supported by the fixing portion and the stop member may comprise a core block that is fitted between the movable portion and the fixing portion. Thereby, the rotation of the movable portion is restricted by the core block jammed between the movable portion and the fixing portion. The core block preferably comprises a lock mechanism that prevents it from being removed from the installation space between the movable portion and the fixing portion.

The movable portion may also be configured to be detachable from the fixing portion in a direction parallel to the belt face and positionable at the fixed position by fitting it to the fixing portion. In this configuration, the stop member preferably comprises a pin member. The movable portion is fixed to the fixing portion by inserting the pin member into holes provided on the movable portion and the fixing portion.

The movable and fixing portions comprise material selected from polyamide, polyacetal, polypropylene, polycarbonate, melamine, phenolic resin, urea resin, polyethylene, PBT, and ABS resin. The material comprises plastic having electrical conductivity.

Advantageous Effects

According to the present invention, the belt retention guide is provided, in which the beads are easily installed on or removed from, without the use of implements.

Patent Citation

Japanese Unexamined Patent Publication No. H05-024522

EXPLANATION OF REFERENCES

Figure 1:
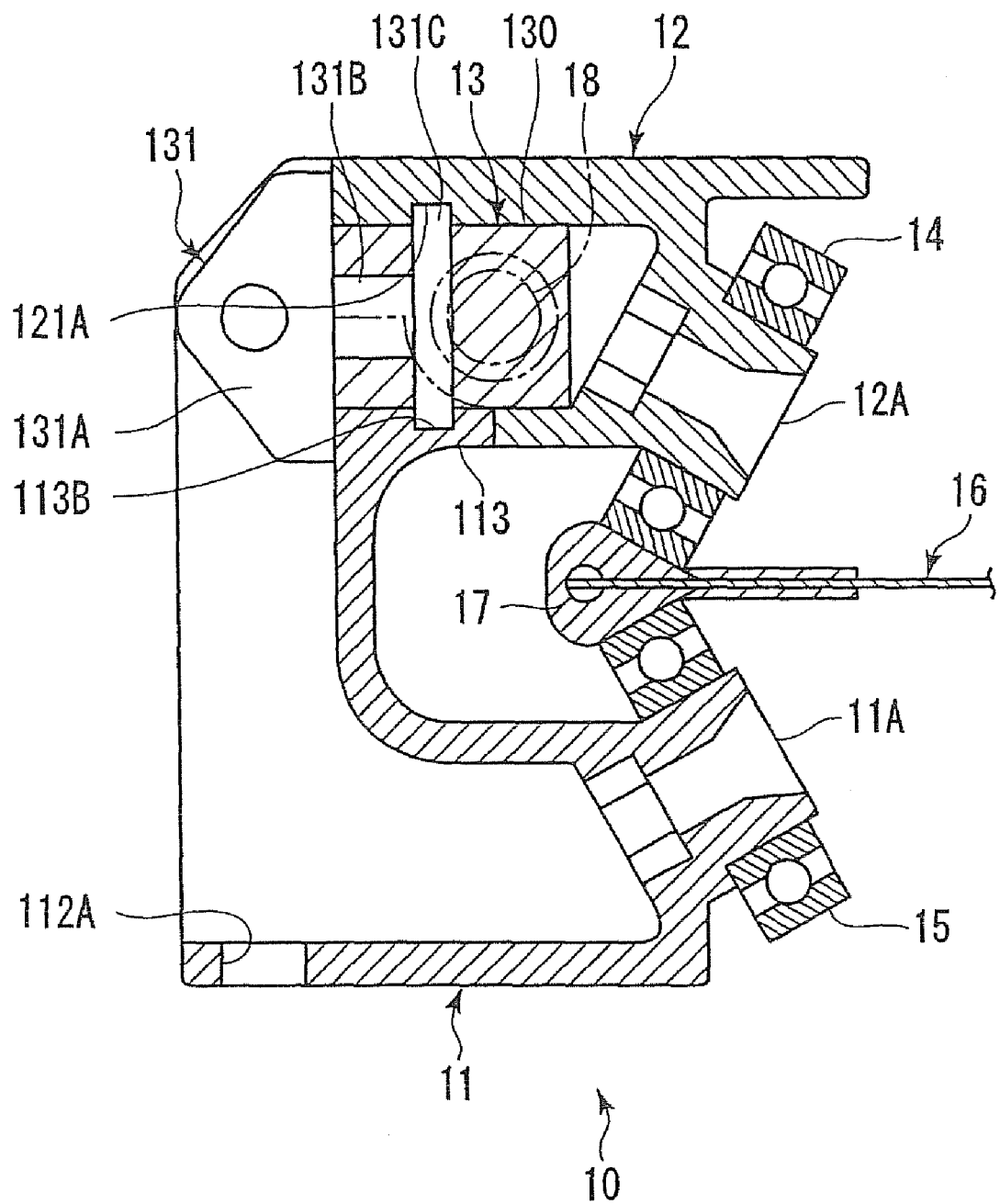
FIG. 1 is a mid-sectional side view of a belt retention guide of the first embodiment of the present invention.

10, 20 Belt retention guide
11, 21 Fixing portion
12, 22 Movable portion
13, 23 Stop member
14 First roller
15 Second roller
16 Curved belt
17 Bead

BEST MODE FOR CARRYING OUT THE INVENTION

In the following, the embodiments of the present invention will be explained with reference to the drawings.

FIG. 1 is a mid-sectional side view of a belt retention guide of a first embodiment of the present invention. The belt retention guide 10 of the present embodiment is mainly comprised of a fixing portion 11, a movable portion 12, and a stop member 13. The fixing portion 11 is fixed to a conveyor body (not shown) using a fastener, such as a bolt, and the fixing portion 11 axially supports the movable portion 12. The stop member 13 is fitted between the fixing portion 11 and the movable member 12, whereby rotation of the movable member 12 is prevented.

The side-sectional profile of the belt retention guide 10, when the movable portion 12 is fixed to the fixing portion 11 by the stop member 13 (hereafter, referred to as the fixed position of the movable portion 12), for example, has a C shape. On each end of the C-shaped belt retention guide 10 (on the front side), roller attachment portions 11A and 12A are provided. The roller attachment portion 11A is provided on an end of the fixing portion 11 and the roller attachment portion 12A is provided on an end of the movable portion 12. A first roller 14 is attached on the roller attachment portion 12A and a second roller 15 is attached on the roller attachment portion 11A. In the present embodiment, a ball bearing ring is used as the first and second roller 14 and 15.

The first and second rollers 14 and 15 are arranged at an angle in which the extended lines of the rotational axes of each roller intersect beyond the space surrounded by the C-shaped belt retention guide 10, when the movable portion 12 is in the fixed position. In this position, the first roller 14 and the second roller 15 are adjacently positioned with a small space between them. Beads 17, which are provided along the peripheral edge of the curved belt 16, are pinched in the vertical direction by the first and second rollers 14 and 15 in this space and thereby retained.

Figure 2:
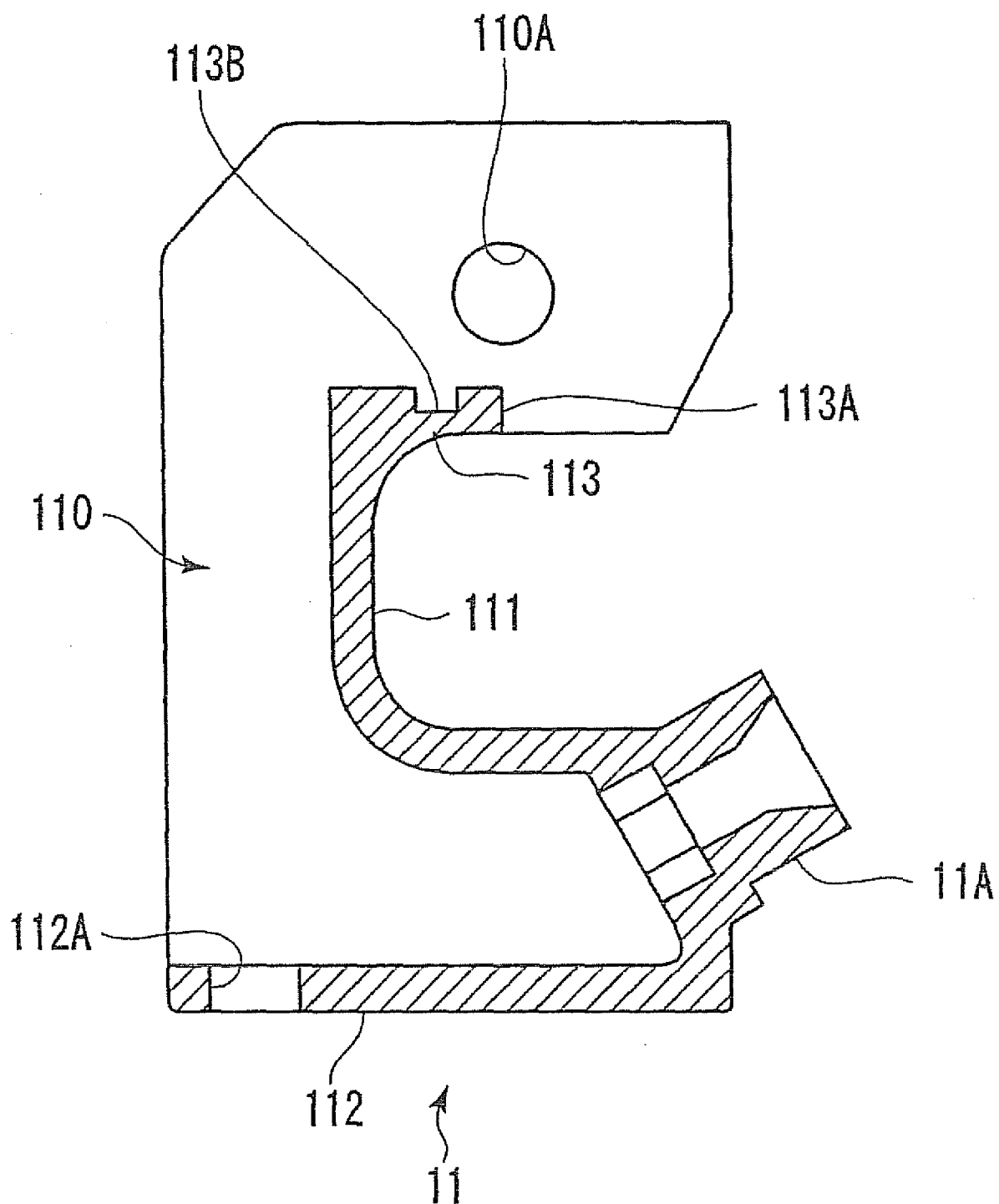
FIG. 2 is a side-sectional view of the fixing portion of the belt retention guide illustrated in FIG. 1.
Figure 3:
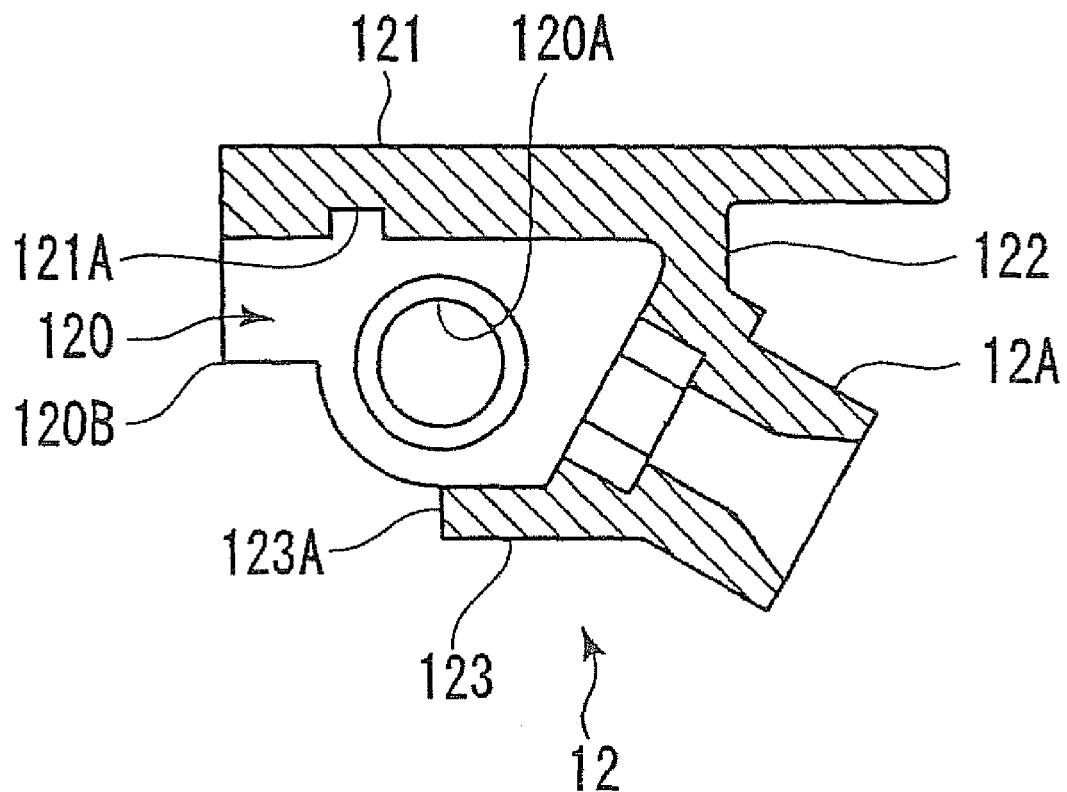
FIG. 3 is a side-sectional view of the movable portion of the belt retention illustrated in FIG. 1.

In FIGS. 2 and 3, mid-sectional side views of the fixing portion 11 and the movable portion 12 are shown (where the first and second rollers 14 and 15 have not been attached). As shown in FIG. 2, a side plate 110 of the fixing portion 11 has a C shape. The front side of the lower part of the fixing portion 11, which has an L shape, is covered by a front plate 111 so that two side plates 110 are connected by the front plate 111. Furthermore, a bottom plate 112 is provided on the base of the fixing portion 11 and the two side plates 110 are also connected by the bottom plate 112. The bottom plate 112 is provided with a bolt attachment hole 112A, into which a bolt is inserted when fixing the belt retention guide 10 onto the conveyer body.

On the other hand, no plate is provided on the back side and the top side of the fixing portion 11 remains open. Furthermore, the front end (front face) of the upper end portion of the fixing portion 11 (a portion other than the L-shaped lower portion of the C-shaped fixing portion 11) and the bottom face of the end portion are also left open and no plate is provided. However, a part of the bottom face of the end portion, the side close to the lower portion, is covered with a plate 113, which is continuously connected to the front plate 111.

The width of the movable portion 12 is approximately equal to the distance between the side plates 110 of the fixing portion 11. The movable portion 12 is disposed between the side plates 110 of the upper portion of the fixing portion 11 and is rotatably supported by the side plates 110 from both sides using two shaft members 18 (see FIG. 1). Namely, shaft holes 110A and 120A, into which the shaft members 18 are inserted, are formed on each of the side plates 110 of the fixing portion 11 and the side plates 120 of the movable portion 12. The axis of the shaft members 18 is perpendicular to the plane including the rotational axes of the first and second rollers 14 and 15. The movable portion 12 is rotatable about this axis when the stop member 13 is detached from the belt retention guide 10.

As shown in FIG. 3, the top face, the front face, and a fore part of the bottom face of the movable portion 12 are each provided with a top plate 121, a front plate 122, and a bottom plate 123. An end face 123A of the bottom plate 123 abuts upon a front side end face 113A of the plate 113 of the fixing portion 11 when the movable portion 12 is positioned at the fixed position. Therefore, further rotation of the movable portion 12 in the direction in which the first roller 14 approaches the second roller 15, is restricted when the movable portion 12 is at the fixed position.

Figure 4:
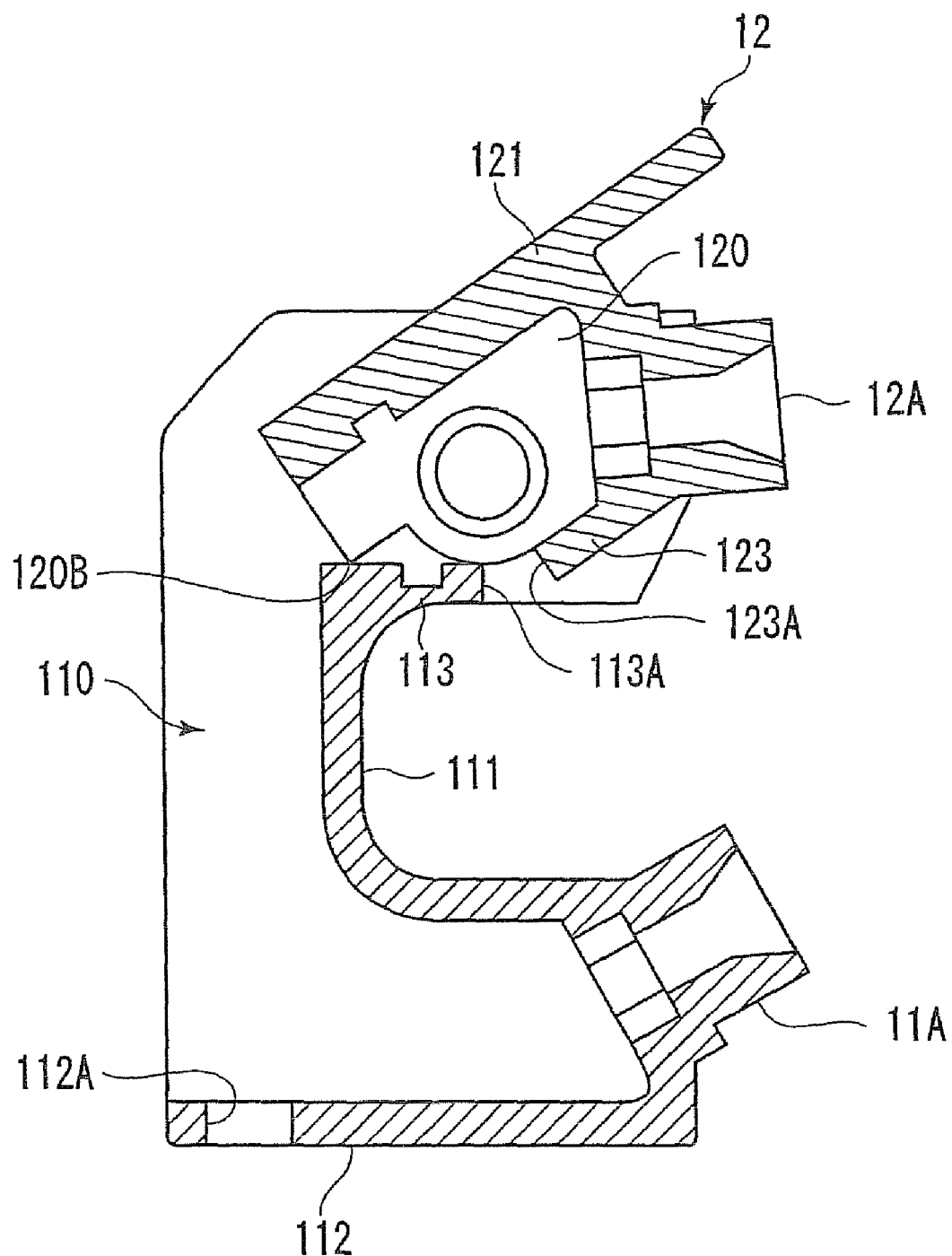
FIG. 4 is a side-sectional view of the belt retention guide when the stop member is detached therefrom and the movable portion is removed from the fixed position.

However, the movable portion 12 at the fixed position is rotatable in the direction in which the first roller 14 is separated from the second roller 15 when the stop member 13 is detached from the belt retention guide 10. Rotation in this direction is allowed until the rear bottom end faces 120B of the side plates 120 abut upon the plate 113 of the fixing portion 11. Therefore, the movable portion 12 is rotatable between the fixed position and the position where the rear bottom end faces 120B engages with the plate 113 (the released position). In FIG. 4, the positional relationship between the fixing portion 11 and the movable portion 12 at the release position, where the first roller 14 is most distant from the second roller 15, is shown as a sectional view (the first and second rollers 14 and 15 are omitted).

The back side of the movable portion 12 and the rear side of the bottom face are left open and no walls are provided. As shown in FIG. 1, when the movable portion 12 is at the fixed position, the top plate 121 of the movable portion 12 and the plate 113 of the fixing portion 11 face each other in parallel and the stop member 13 is fitted into the space between the top plate 121 and the plate 113 from the backside, which is left open. Namely, the stop member 13 is used as a core member inserted between the top plate 121 and the plate 113 whereby rotation of the movable portion 12 is restricted. Thereby, the position of the movable portion 12 is fixed at the fixed position.

In the present embodiment, the stop member 13 is the core member generally formed as a parallele piped block. The height of the block is approximately the same as the distance between the top plate 121 and the plate 113. The width of the block is approximately the same as the distance between the side plates 120 of the movable portion 12. Therefore, the top face and the bottom face of the stop member 13 closely contact both the top plate 121 and the plate 113 when it is installed. Thereby, the movable portion 12 is secured to the fixed position with a close tolerance.

Furthermore, a lock mechanism prevents the stop member 13 from slipping out of the installation space between the top plate 121 and the plate 113. With reference to FIG. 1 and FIGS. 5-8, structures of the stop member 13 of the present embodiment will be explained.

Figure 5:
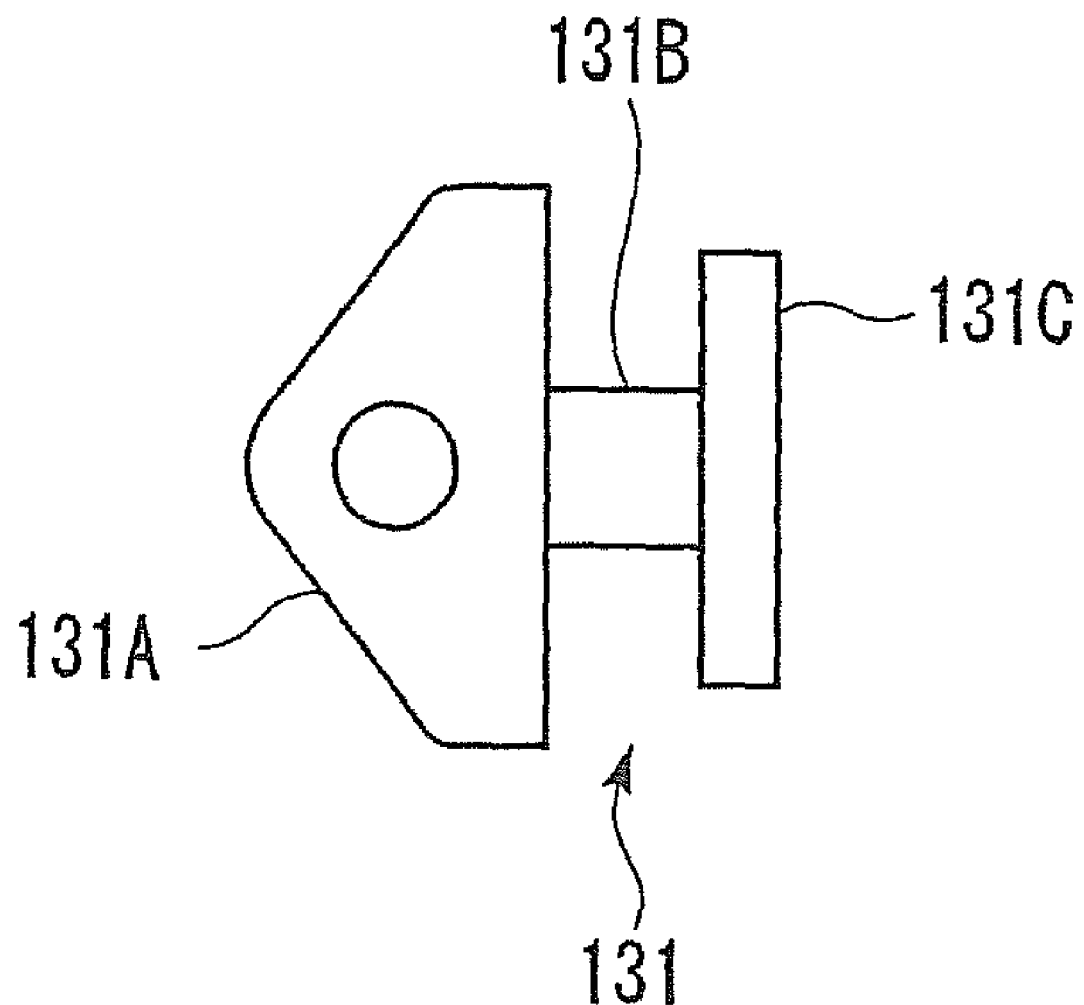
FIG. 5 is a plan view of the lock member of the stop member of the first embodiment.
Figure 6:
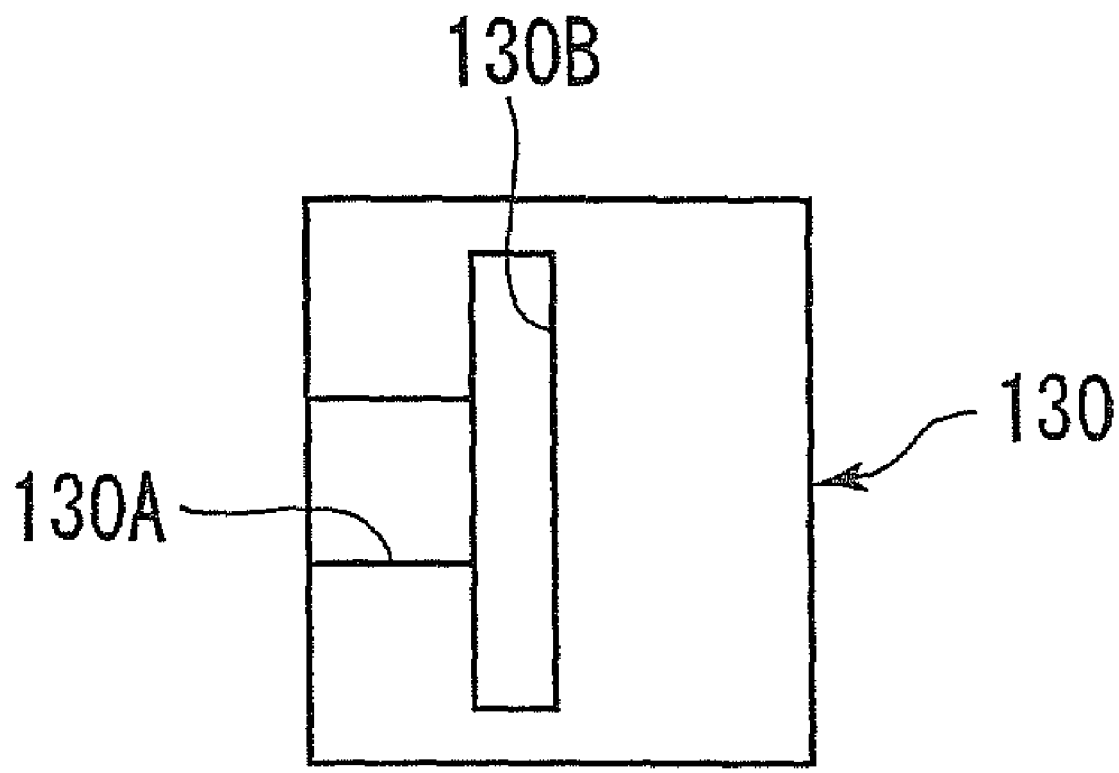
FIG. 6 is a top view of a core block of the stop member of the first embodiment.
Figure 7:
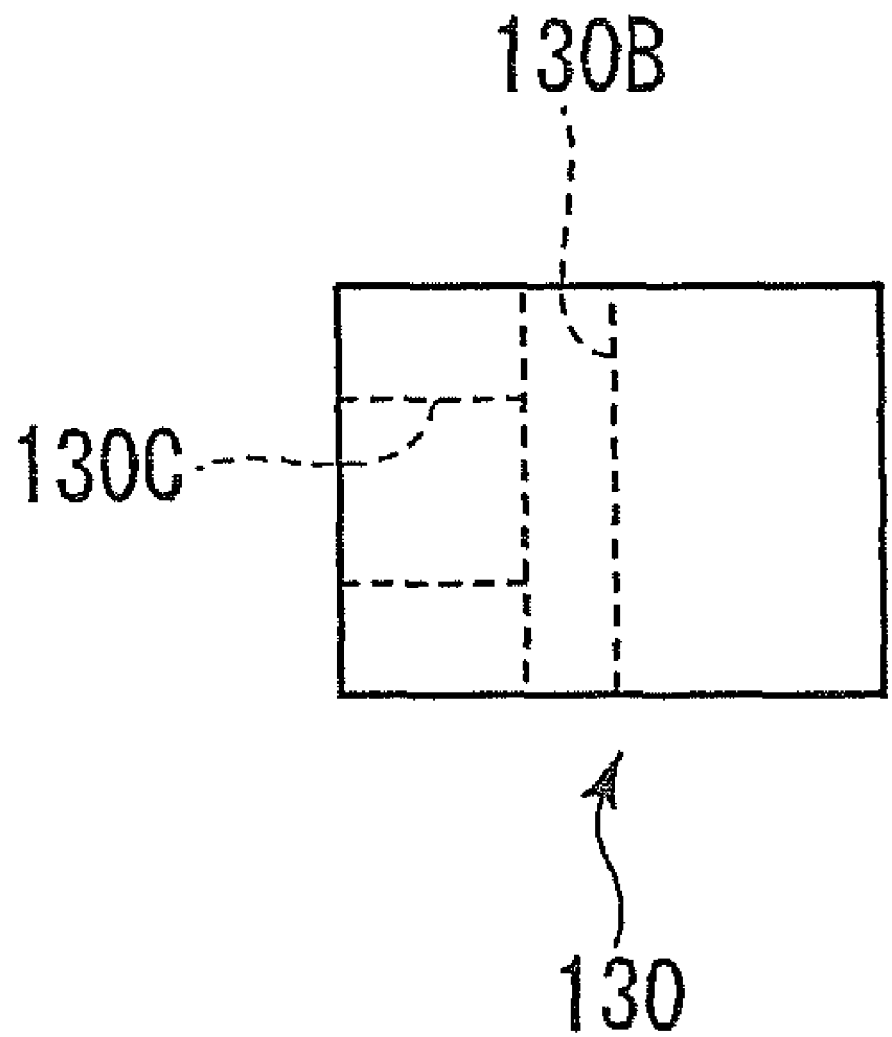
FIG. 7 is a side view of the core block.

The stop member 13 is comprised of the parallelepiped shaped core block 130 and a lock member 131 for preventing the core block 130 from slipping. A plan view of the lock member 131 is shown in FIG. 5. A top view, a side view, and a rear view of the core block 130 are shown in FIGS. 6-8, respectively.

As shown in FIG. 5, the lock member 131 includes a handle section 131A for rotating the member, a shaft section 131B, and a rod section 131C, which is perpendicular to the shaft section 131B. A shaft groove 130A for bearing the shaft section 131B and a rod groove for receiving the rod 131C are formed upon the core block 130.

Figure 8:
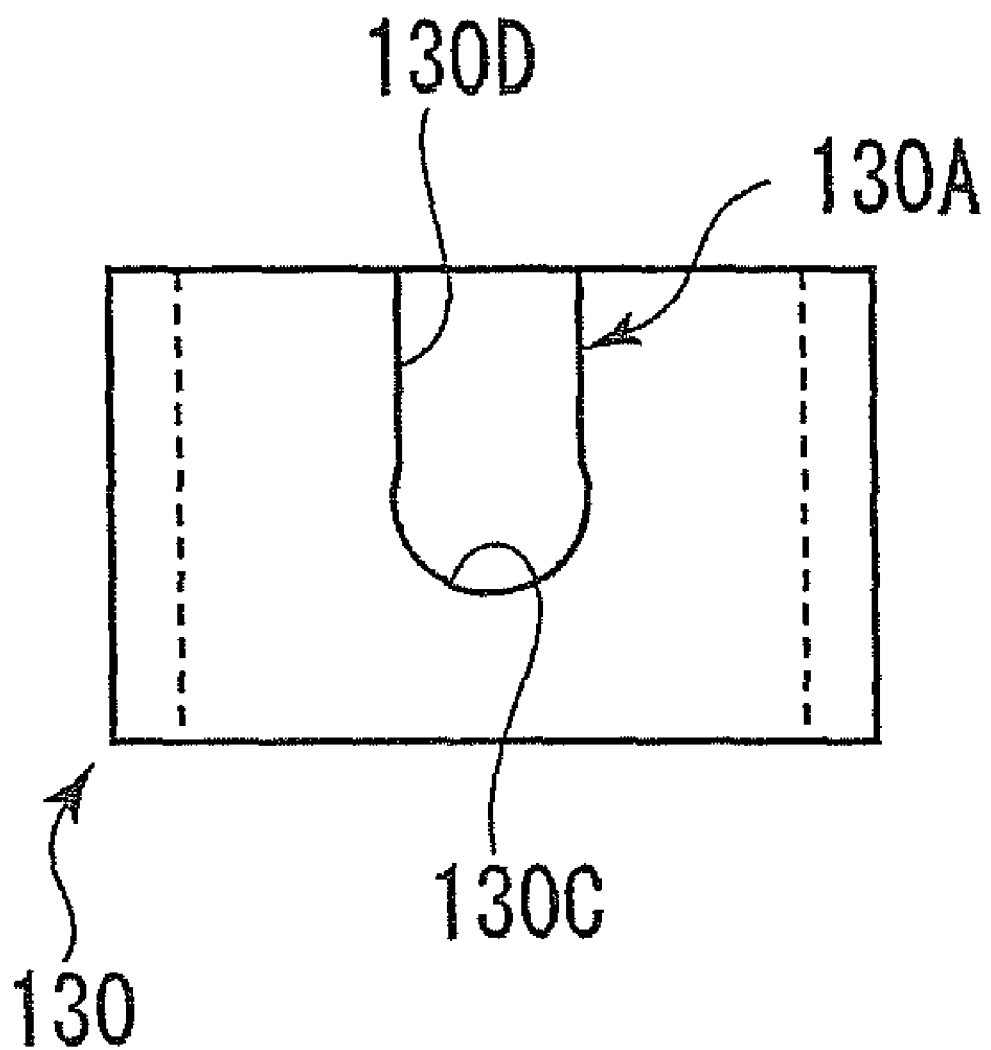
FIG. 8 is a rear view of the core block.

As shown in FIG. 8, the shaft groove 130A is comprised of a bearing section 130C and an installation groove 130D. The bearing section 130C is a section where the shaft section 131 is journaled. The bearing section 130C penetrates the core block 130 from the center of the back side face of the core block 130 to the center of the core block 130. The inside diameter of the bearing section 130C is approximately the same as the outer diameter of the shaft section 131B. The installation groove 130D is a groove through which the shaft section 131B is guided when the shaft section 131B is installed in the bearing section 130C. The installation groove 130D is connected to the bearing section 130C from the top face of the core block 130 along the bearing section 130C. The width of the groove is slightly narrower than the diameter of the shaft section 131B. Therefore, the shaft section 131B is slightly compressed when the shaft section 131B passes through the installation groove 130D.

A rod groove 130B penetrates from the top face to the bottom face of the core block 130. The length of the rod section 131C is slightly shorter than the length of the rod groove 130B and slightly longer than the height of the core block 130. Therefore, the rod section 131C is rotatable within the rod groove 130B. When the rod section 131C is horizontally positioned, the rod section 131C is housed inside the rod groove 130B. When the rod section 131C is substantially positioned in the vertical direction by a rotational operation of the handle section 131A, both ends of the rod section 131C protrude from the top face and the bottom face of the core block 130.

As shown in FIGS. 1-3, grooves 113B and 121A are formed on the plate 113 of the fixing portion 11 and the top plate 121 of the movable portion 12, respectively, at the position corresponding to the rod section 131C of the stop member 13 that is installed between the top plate 121 and the plate 113. Both ends of the rod section 131C, which extend out from the top and bottom faces of the core block 130 engage the grooves 113B and 121A. Thereby, the stop member 13 is prevented from slipping out from the installation position.

Figure 9:
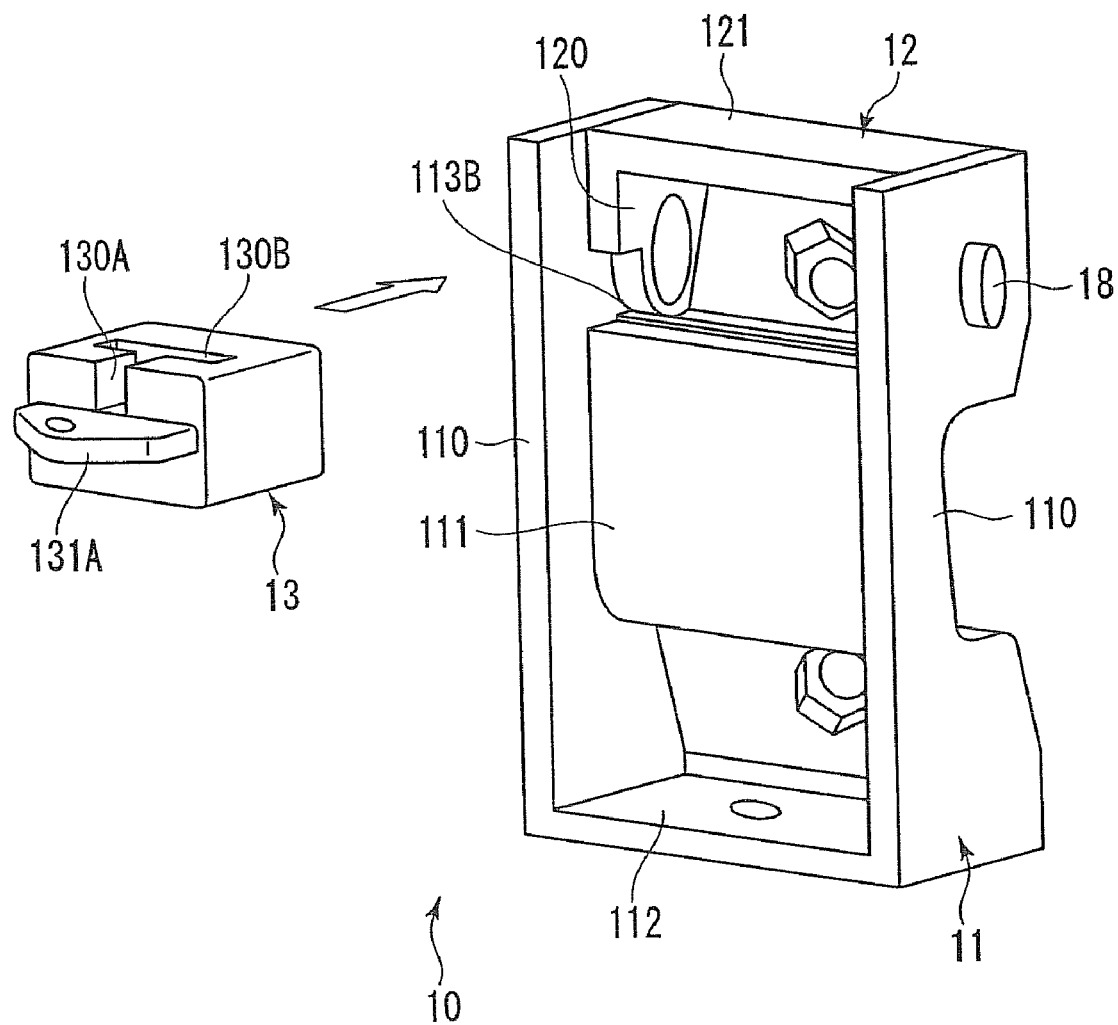
FIG. 9 is a rear perspective view of the belt retention guide of the first embodiment before the stop member is attached.
Figure 10:
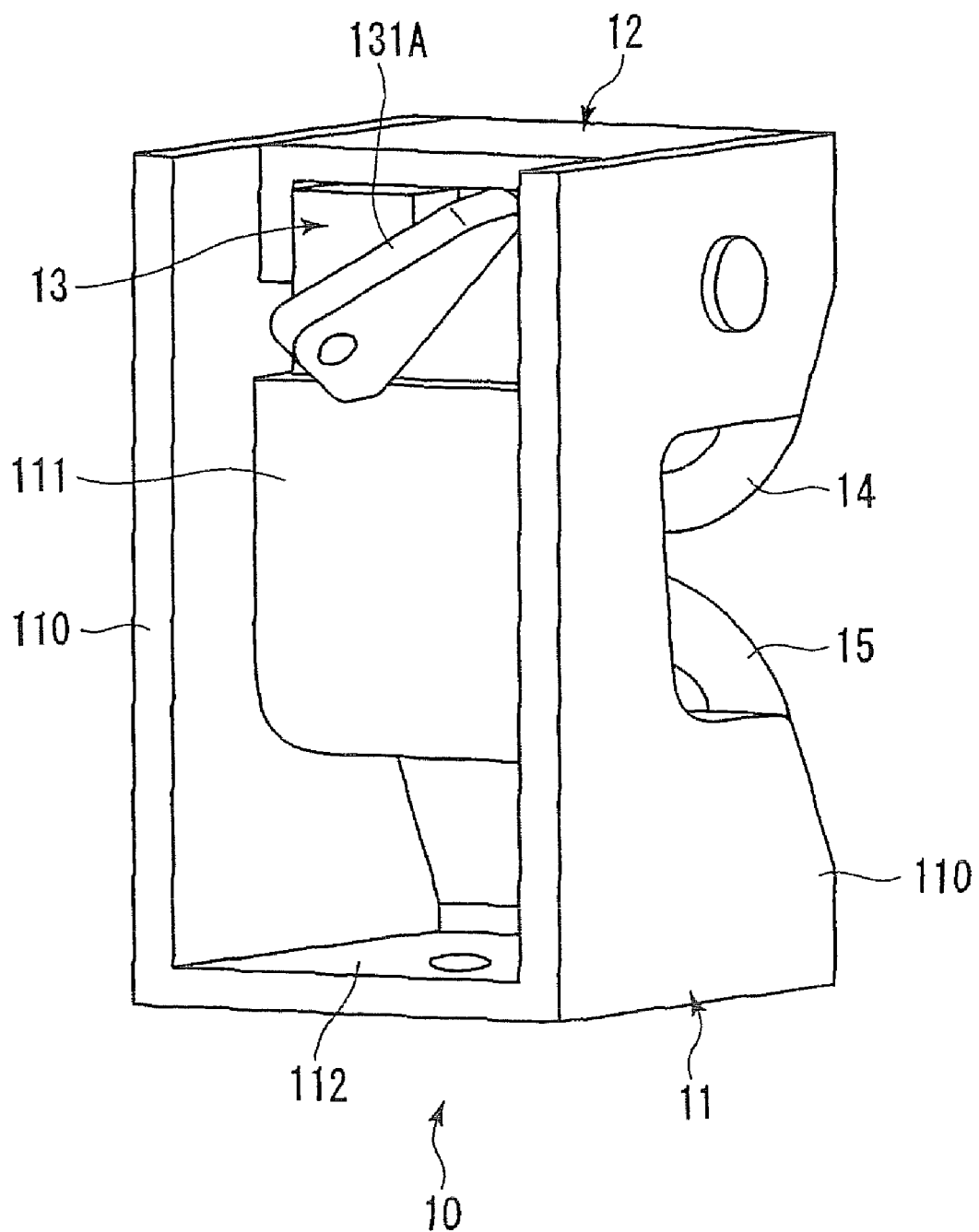
FIG. 10 is a rear perspective view of the belt retention guide of the first embodiment after the stop member is attached.

FIG. 9 is a rear perspective view of the belt retention guide 10 that schematically illustrates a state when the stop member 13 is inserted into the belt retention guide 10, in which the movable portion 12 is attached to the fixing portion 11. Furthermore, FIG. 10 is a rear perspective view of the belt retention guide 10 that illustrates the situation in which the stop member 13 is inserted between the fixing portion 11 and the movable portion 12, and when the handle section 131A is rotated approximately 45 degrees.

As described above, according to the first embodiment, the movable portion 12 is secured at the fixed position, in which the rollers 14 and 15 pinch the beads 17, only by fitting the stop member 13 from the back side of the belt retention guide 10. Furthermore, the beads 17 are released by extracting the stop member 13, and in turn, displacing the movable portion 12 from the fixed position. In addition, removal or slipping out of the stop member 13 is securely prevented by the 90-degree rotational operation of the handle section 131A.

Furthermore, the force from the belt which acts on the first roller 14 substantially comes to bear upon the stop member 13, which is inserted between the movable portion 12 and the fixing portion 11, so that the inventive belt retention guide 10 of the first embodiment has an advantage in strength.

Figure 11:
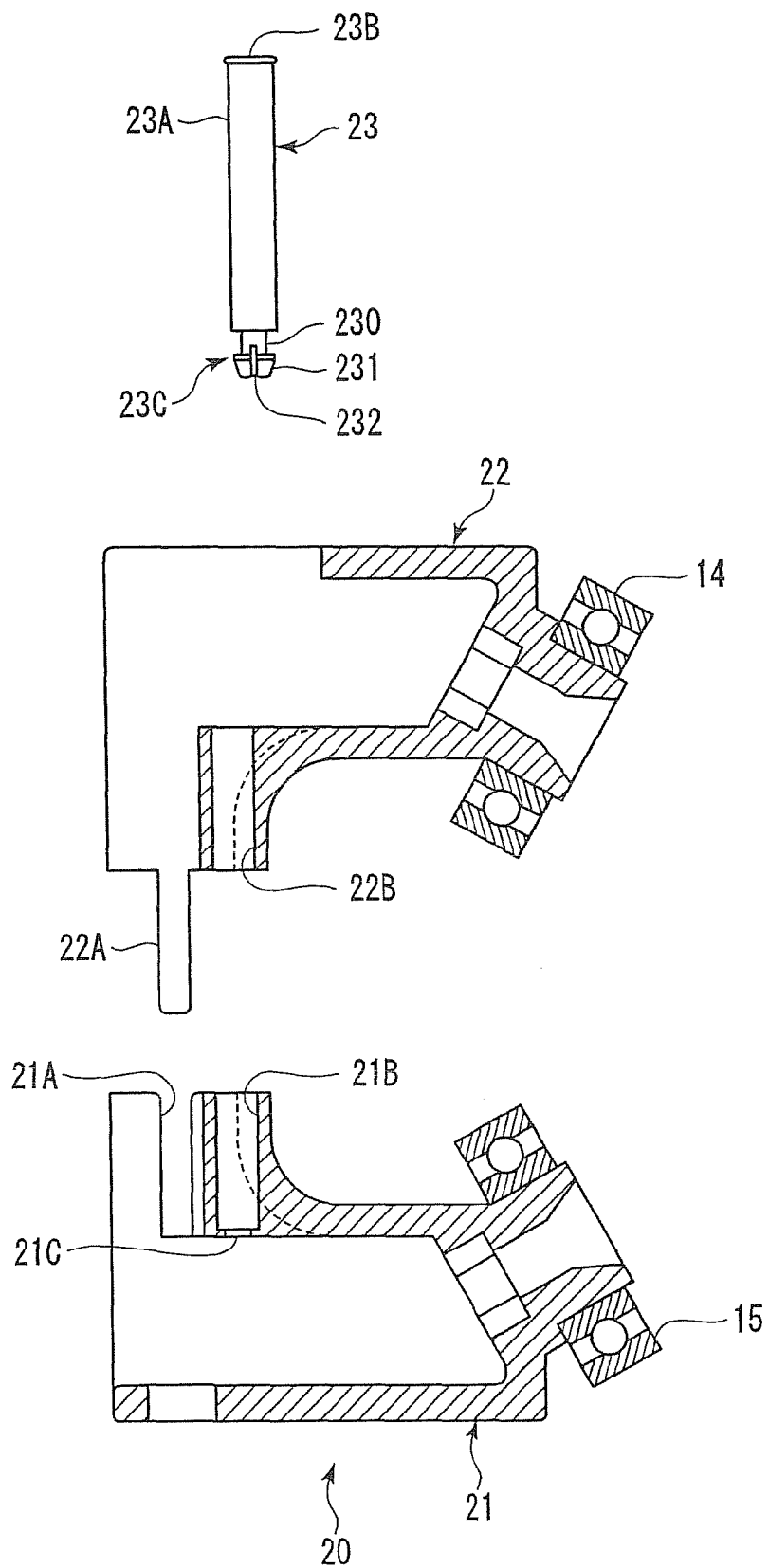
FIG. 11 is a side sectional view of a second embodiment.

With reference to FIG. 11, a second embodiment of the inventive belt retention guide will be explained. Note that structures that are the same as in the first embodiment will be referred to by the same numerals and their explanation will be omitted.

The belt retention guide 20 of the second embodiment is a type that is separable into an upper portion and a lower portion. In this embodiment, the lower half is a fixing portion 21 and the upper half is a movable portion 22. The movable portion 22 and the fixing portion 21 are fitted together substantially in the vertical direction with respect to the face of the belt. The movable portion 22 is fixed to the fixing portion 21 by a stop member (a pin) 23 that is engaged with the movable portion 22 and the fixing portion 21.

For example, the fixing portion 21 is provided with a recessed portion 21A (e.g., a groove or a hole) and the movable portion 22 is provided with a protuberance 22A which fits into the recessed portion 21A. The movable portion 22 is vertically moved toward the fixing portion 21 so that the protuberance 22A is inserted into the recessed portion 21A. When the protuberance 22A is fully fitted into the recessed portion 21A, the first roller 14 is positioned at the fixed position with respect to the second roller 15. Furthermore, on the body of the fixing portion 21 and the movable portion 22, holes 21B and 22B, for example, that penetrate in the vertical direction are provided respectively. The holes 21B and 22B are coaxially aligned when the protuberance 22A is fitted into the recessed portion 21A and the pin 23 is inserted in these holes.

The pin 23 has a shaft section 23A, a head section 23B, and a distal end section 23C. The outer diameter of the shaft section 23A is substantially the same as the inner diameter of the holes 21B and 22B. The head section 23B is provided at one end of the shaft section 23A. Furthermore, the outer diameter of the head section 23B is larger than the inner diameter of the holes 21B and 22B.

The distal end section 23C is provided on the other end of the shaft section 23A and has a connecting section 230 and a lock section 231. The connecting section 230 connects the shaft section 23A and the lock section 231. The connecting section 230 is formed as a shaft and has a diameter slightly narrower than the diameter of the shaft section 23A. The lock section 231 is formed as a truncated conical shape which is tapered toward the end. The maximum diameter of the lock section 231 has a size approximately equal to the shaft section 23A. Furthermore, a groove 232 is formed from the distal end of the lock section 231 to the front end of the connecting section 230.

The inner diameter of a bottom end 21C of the hole 21B, which is provided on the fixing portion 21, is slightly narrowed and its size is approximately equal to the outer diameter of the connecting section 230. Namely, when the pin 23 is inserted into the holes 22B and 21B, the side face of the lock section 231, which is tapered, abuts the bottom end 21C. Since the lock section 231 is provided with the groove 232, the diameter of the lock section 231 is reduced when the pin 23 is further pressed into the holes 22B and 21A. Thus, the lock section 231 passes through the bottom end 21C. When the lock section 231 fully penetrates the bottom end 21C, the diameter of the lock section 231 recovers to the original diameter by elasticity, so that the lock section 231 engages with the bottom end 21C and the pin 23 is secured. At this time, the head section 21B engages with the top end of the hole 22A of the movable portion 22 whereby the movable portion 22 is fixed to the fixing portion 21. Note that the pin 23 can be extracted from the holes 22B and 21B by pinching the lock section 231 and thus reducing the diameter of the lock section 231, and then pulling the head section 23B out.

As described above, according to the second embodiment, the movable portion can easily be fixed to the fixed position, where the beads are retained, only by fitting the movable portion vertically into the fixing portion and inserting the stop member. Furthermore, the beads can be released from the belt retention guide by extracting the stop member and translating the movable member. The belt force that bears upon the first and second rollers is supported by the mating engagement between the protuberance and the recessed portion provided on the movable portion and the fixing portion, thereby giving the embodiment an advantage in strength. Note that in the second embodiment, the stop member, such as a pin, is vertically inserted into the hole; however, the pin may be inserted into a hole that penetrates the protuberance and the recessed portion in the horizontal direction.

Although in the present embodiments the belt retention guides were specified as a device for a curved belt, the belt retention guides of the present embodiments can also be applied to a linear conveyor belt or to a spiral conveyor belt.

Note that the material of the movable and fixing portions may be selected from polyamide, polyacetal, polypropylene, polycarbonate, melamine, phenolic resin, urea resin, polyethylene, PBT, ABS resin, and the like. Furthermore, to gain the advantage of eliminating static charge from the belt, a plastic provided with electrical conductivity may be used as the material.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2007-074049 (filed on Mar. 22, 2007), which is expressly incorporated herein, by reference, in its entirety.

The invention claimed is:

1. A belt retention guide for retaining the position of a belt having beads along a peripheral edge thereof, the belt retention guide comprising:
    a first roller;
    a movable portion that supports the first roller; and
    a fixing portion that engages with the movable portion, the movable portion being configured to be movable between a released position where the first roller is separated from the beads to release the beads and a fixed position where the first roller engages with the beads to pinch the beads between the first roller and the fixing portion and thereby the position of the belt is retained,
    wherein the movable portion is secured to the fixed position by inserting a stop member between the movable portion and the fixing portion when the movable portion is in the fixed position,
    wherein the movable portion is supported by the fixing portion at a supporting axis so as to be rotatable around the supporting axis,
    wherein the stop member comprises a core block that is fitted between the movable portion and the fixing portion and rotation of the movable portion is restricted by the core block jammed between the movable portion and the fixing portion when the movable portion is in the fixed position,
    wherein the supporting axis is parallel to a surface of the belt and the rotational axis of the first roller is in a plane perpendicular to the supporting axis, and
    wherein the stop member is disposed at an opposite side of the supporting axis than the first roller when the movable portion is in the fixed position.

2. The belt retention guide as in claim 1, wherein the fixing portion comprises a second roller, and the beads are pinched between the first and second rollers.

3. The belt retention guide as in claim 1, wherein the core block comprises a lock mechanism that prevents the core block to be removed from an installation space between the movable portion and the fixing portion.

4. The belt retention guide as in claim 1, wherein the movable portion and the fixing portion comprise material selected from polyamide, polyacetal, polypropylene, polycarbonate, melamine, phenolic resin, urea resin, polyethylene, PBT, and ABS resin.

5. The belt retention guide as in claim 4, wherein the material comprises plastic having electrical conductivity.

6. The belt retention guide as in claim 1, wherein the movable portion has a top plate provided at a top of the movable portion, the fixing portion has a support plate which is parallel to the top plate and faces the top plate when the movable portion is in the fixed position, and the stop member is fitted into a space between the top plate and the support plate when the movable portion is in the fixed position.

7. The belt retention guide as in claim 6, the stop member is a parallelepiped block and a height of the parallelepiped block is approximately a same as a distance between the top plate and the support plate when the movable portion is in the fixed position.

8. A belt retention guide for retaining the position of a belt having beads along a peripheral edge thereof, the belt retention guide comprising:
    a first roller;
    a movable portion that supports the first roller; and
    a fixing portion that engages with the movable portion, the movable portion being configured to be movable between a released position where the first roller is separated from the beads to release the beads and a fixed position where the first roller engages with the beads to pinch the beads between the first roller and the fixing portion and thereby the position of the belt is retained,
    wherein the fixing portion includes a recessed portion and the movable portion includes a protruding portion, and
    wherein the movable portion is detachable from the fixing portion in a direction vertical to the belt face and the movable portion is positioned at the fixed position by fitting the recessed portion of the movable portion to the protruding portion of the fixing portion.

9. The belt retention guide as in claim 8, wherein the movable portion is fixed to the fixing portion at the fixed position by inserting a pin member into holes provided on the movable portion and the fixing portion.

10. The belt retention guide as in claim 9, wherein the holes penetrate the movable portion and the fixing portion vertically when the movable portion is in the fixed position.

* * * * *